(12) United States Patent
Dowen et al.

(10) Patent No.: US 6,356,056 B2
(45) Date of Patent: Mar. 12, 2002

(54) BATTERY BYPASS ASSEMBLY

(75) Inventors: David E. Dowen; Scott F. Tibbitts; Scott S. Christiansen, all of Longmont, CO (US)

(73) Assignee: Starsys Research Corporation, Boulder, CO (US)

( * ) Notice: Subject to any disclaimer, the term of this patent is extended or adjusted under 35 U.S.C. 154(b) by 0 days.

(21) Appl. No.: 09/765,816

(22) Filed: Jan. 19, 2001

Related U.S. Application Data

(60) Provisional application No. 60/177,312, filed on Jan. 21, 2000.

(51) Int. Cl.[7] .............................. H02J 7/00; H02B 1/24
(52) U.S. Cl. ........................................ 320/122; 307/125
(58) Field of Search .................................. 320/119, 121, 320/120, 122; 307/125

(56) References Cited

U.S. PATENT DOCUMENTS 6,181,106 B1 * 1/2001 Finger ......................... 320/124

* cited by examiner

Primary Examiner—Gregory J. Toatley, Jr.
(74) Attorney, Agent, or Firm—Emery L. Tracy

(57) ABSTRACT

A battery bypass assembly for bypassing for bypassing a first battery cell electrically connected to a second battery cell. The battery bypass assembly has a first bypass contact and a second bypass contact. A voltage sensing mechanism is electrically connected between the first battery contact and the second battery contact for sensing a predetermined voltage loss. An expansive material within the housing expands upon the voltage sensing mechanism sensing a predetermined voltage loss. A plunger mechanism is moveable from a first position to a second position with a maintaining mechanism maintaining the plunger mechanism in the first position and moveable to allow the plunger mechanism to move into the second position. An actuating mechanism contacts the expansive material and the maintaining mechanism for moving the maintaining means upon expansion of the expansive material wherein the plunger mechanism, upon reaching the second position, bypasses the first battery cell.

20 Claims, 7 Drawing Sheets

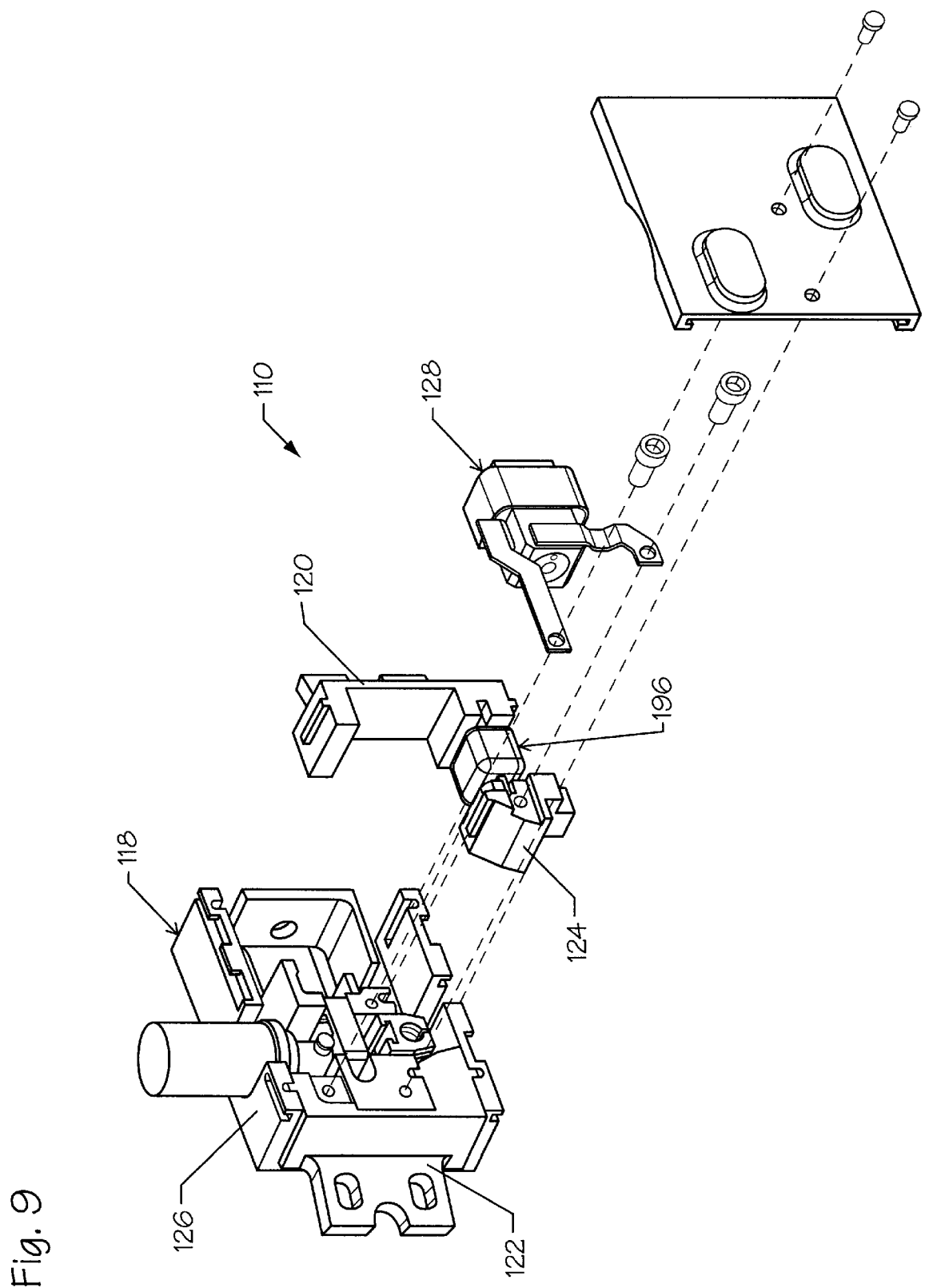

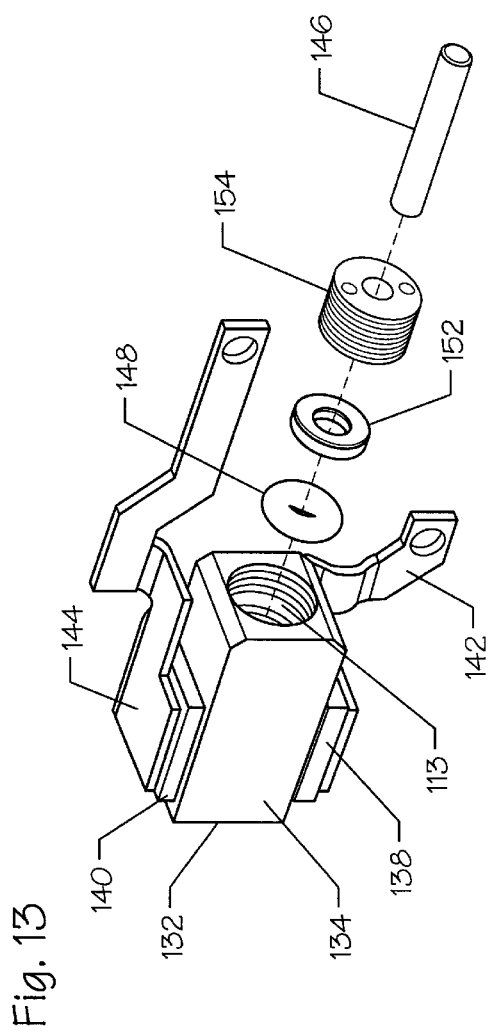
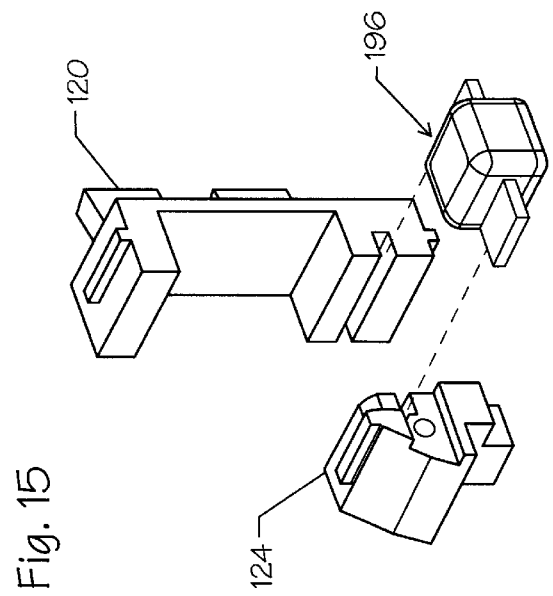
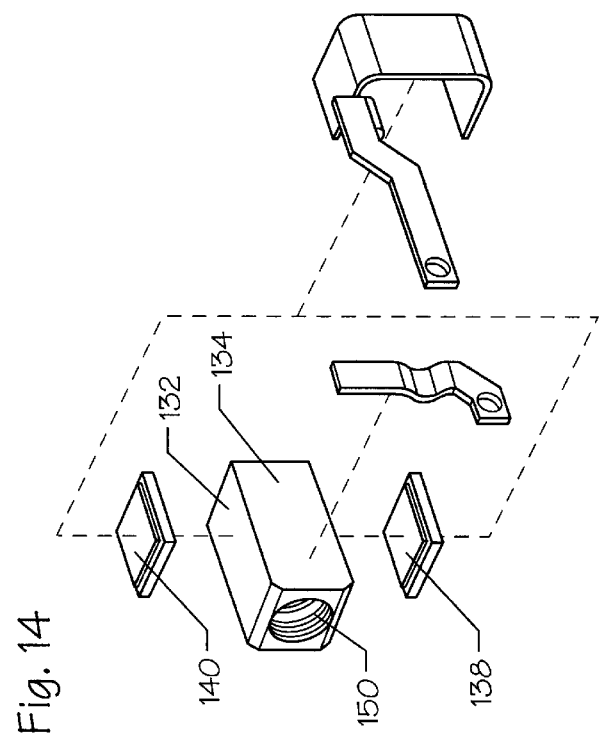

BATTERY BYPASS ASSEMBLY

The present application is a continuation-in-part of pending provisional patent application Ser. No. 60/177,312, filed on Jan. 21, 2000, entitled "Battery Bypass Assembly".

BACKGROUND OF THE INVENTION

1. Field of the Invention

This invention relates generally to a battery bypass assembly and, more particularly, it relates to a battery bypass assembly for a spacecraft battery supply system which removes a failing battery cell from the battery supply system without causing power loss within the battery supply system.

2. Description of the Prior Art

Today, spacecraft in high-earth orbit, such as satellites and the like, are becoming more and more important in supplying technological advances to feed an increasing government, business, and consumer appetite. In order to provide an uninterrupted power supply to the spacecraft, the spacecraft has a battery supply system. The conventional spacecraft battery supply system is typically constructed from a plurality of battery cells arranged in series or parallel arrays, according to the required voltage and current output of the battery supply system. While most of the equipment within the spacecraft can properly operate at voltages of twenty-two (22 V) volts, twenty-four (24 V) volts, or twenty-six (26 V) volts, the desired total voltage to power the spacecraft is twenty-eight (28 V) volts in the event that one or more of the battery cells becomes inoperable.

In most spacecraft, the plurality of battery cells are either nickel cadmium (NiCd), nickel-metal hydride (NiMH) batteries having an approximate voltage of between 1.2 volts and 1.5 volts or lithium ion battery cells having an approximate voltage of between 2.0 volts and 2.5 volts. While nickel-metal hydride batteries are typically used in spacecraft today, lithium ion batteries are rapidly becoming the power source of choice for future space applications. The lithium ion batteries exhibit high energy and power both per unit volume and per unit weight in comparison with other rechargeable type batteries.

The design of the battery supply system of a spacecraft presents special challenges not typically found in sub-orbit applications. The spacecraft battery supply system must continue to operate in an acceptable manner for years while physically inaccessible to maintenance and repair because the spacecraft is in high-earth orbit. When one of the battery cells starts going bad or otherwise loses power, the failing or failed battery cell ceases pumping voltage. As the battery cell continues to decline, the battery cell actually becomes a resistor to the entire battery supply system pulling power from the battery supply system and creating excessive heat. Loss of power and excessive heat can interfere with the operation of the spacecraft and could, potentially, cause the battery cell to explode.

In the past, a battery bypass has been used for each battery cell to bypass any battery cell which loses power to remove the battery cell from the battery supply system. Otherwise, as mentioned above, if one of the battery cells were to fail to an open circuit condition, the battery would be rendered inoperable in the open-circuit state. The battery bypass permits the failed battery cell to be bypassed, so that the battery supply system continues to functions although at a slightly diminished performance level. Therefore, it is common practice to overdesign the spacecraft battery supply systems according to the statistical probabilities of failure of one or more of the battery cells in the battery supply system, so that, through the use of the battery bypass, the battery supply system can continue to function in an acceptable manner.

Previous battery cell management devices for the battery supply system typically used diodes or a relay device to short out failed cells. Unfortunately, these conventional battery bypass systems were unreliable, heavy, and generated excessive heat which could damage the entire spacecraft and its functions. Furthermore, conventional battery bypass systems can suffer damage during launch thereby jeopardizing the entire functionality of the spacecraft upon battery supply system failure.

Accordingly, there exists a need for a battery bypass assembly which can remove individual battery cells from the battery supply system. Additionally, a need exists for a battery bypass assembly which is lightweight and reliable for high-earth orbit applications. Furthermore, there exists a need for a battery bypass assembly which safely maintains a battery supply system in an operating condition with all types of rechargeable battery cells.

SUMMARY

The present invention is a battery bypass assembly for bypassing a first battery cell electrically connected to a second battery cell. Each battery cell has a first battery contact and a second battery contact. The battery bypass assembly comprises a housing having a first bypass contact and a second bypass contact. Voltage sensing means is mounted within the housing and is electrically connected between the first battery contact and the second battery contact for sensing a predetermined voltage loss in the battery cell. An expansive material within the housing expands upon the voltage sensing means sensing a predetermined voltage loss in the battery cell. A plunger mechanism is slidably mounted within the housing and is moveable from a first position to a second position. Maintaining means maintains the plunger mechanism in the first position and is moveable to allow the plunger mechanism to move into the second position. Actuating means contacts the expansive material and the maintaining means for moving the maintaining means upon expansion of the expansive material wherein the plunger mechanism, upon reaching the second position, bypasses the first battery cell. The present invention additionally includes a battery bypass mechanism for bypassing a battery cell. The battery cell has a first battery contact and a second battery contact. The battery bypass mechanism comprises a first bypass contact electrically connected to the first battery contact and a second bypass contact electrically connected to the second battery contact. Contact means are selectively movable to close the circuit between the first battery bypass contact and the second battery contact. Expansive actuating means actuate movement of the contact means to close the circuit and bypass the battery cell upon occurrence of a predetermined event.

The present invention further includes a method for bypassing a battery cell with a battery bypass assembly. The battery bypass assembly has a first bypass contact electrically connected to a first battery contact and a second bypass contact electrically connected to the second battery contact. The method comprises selectively moving a conductive bar between the first battery bypass contact and the second battery contact from a first position to a second position to close the circuit, providing a plunger rod within an expansive material, expanding the expansive material upon the occurrence of a predetermined event, substantially ejecting the plunger rod from the paraffin material, moving the conductive bar to the second position, and closing the circuit and bypassing the battery cell.

BRIEF DESCRIPTION OF THE DRAWINGS

FIG. 9 is a perspective view the battery bypass assembly of FIG. 8, constructed in accordance with the present invention;

FIG. 13 is an exploded perspective view of an actuator assembly of the battery bypass assembly of FIG. 8, constructed in accordance with the present invention;

FIG. 14 is an exploded perspective view of an actuator diode assembly of the battery bypass assembly of FIG. 8, constructed in accordance with the present invention; and FIG. 15 is an exploded perspective view of a fuse assembly of the battery bypass assembly of FIG. 8, constructed in accordance with the present invention.

DETAILED DESCRIPTION OF THE PREFERRED EMBODIMENTS

Figure 1:
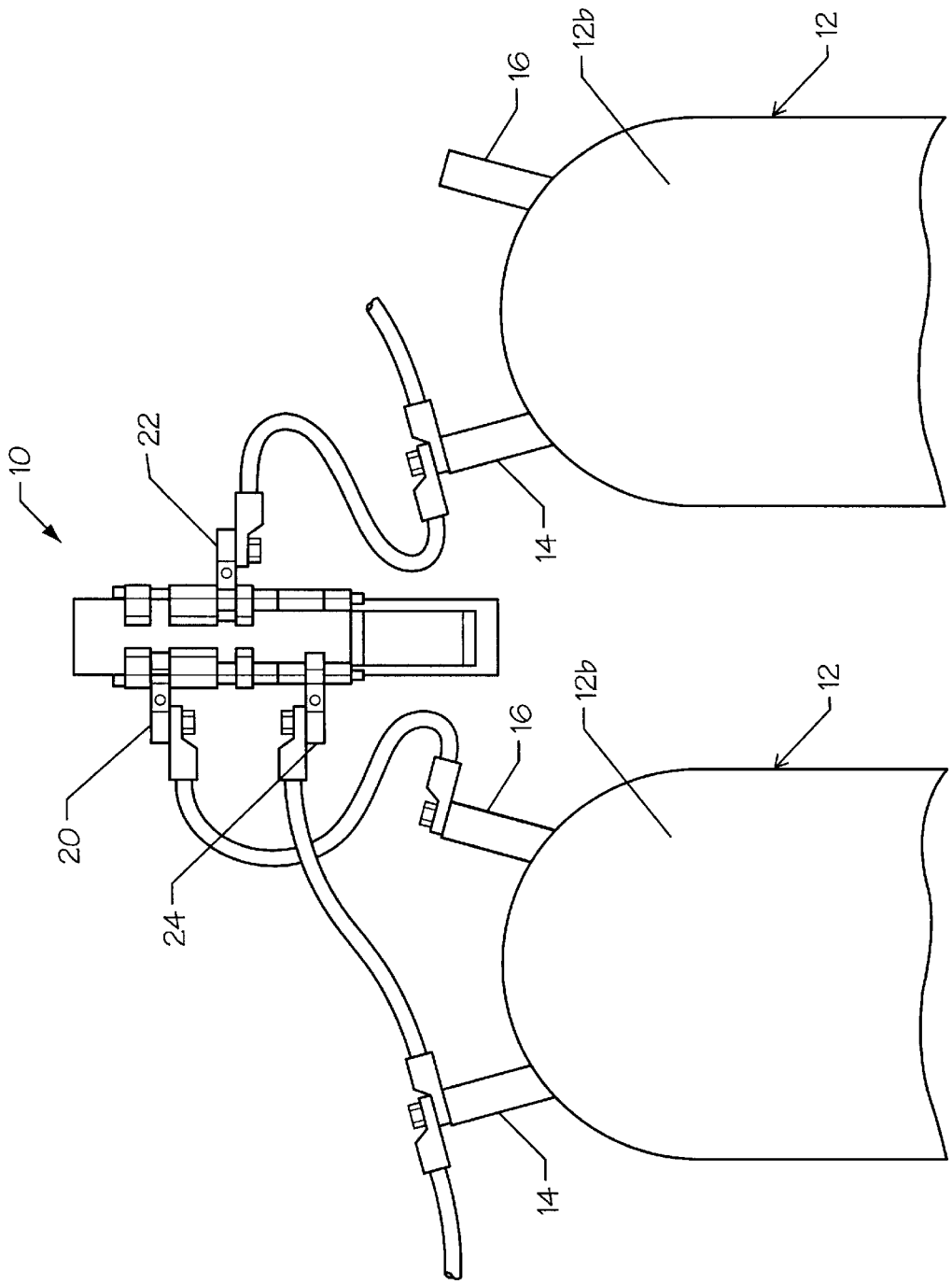
FIG. 1 is an elevational side view illustrating the battery bypass assembly, constructed in accordance with the present invention, with the battery bypass assembly being connected to a first battery cell and a second battery cell.

As illustrated in FIG. 1, the present invention is a battery bypass assembly, indicated generally at 10, for use with a plurality of battery cells 12, such as a first battery cell 12a and a second battery cell 12b arranged in series or parallel arrays depending on the application and the desires of the user. Each battery cell 12 has a first battery cell contact 14 and a second battery cell contact 16 with the first battery cell contact 14 and the second battery cell contact 16 being electrically connected to an adjacent battery cell (not shown).

As described herein, the battery bypass assembly 10 is especially suited for use in a spacecraft (not shown) for flying in a high-earth orbit. The spacecraft can include any type of spacecraft including, but not limited to, satellites and space vehicles. It should be noted, however, that the battery bypass assembly 10 of the present invention can be used with battery cells 12 for powering various applications on a spacecraft or other structure or system.

Still referring to FIG. 1, the battery bypass assembly 10 of the present invention includes a main body 18 having a first bypass contact 20, a second bypass contact 22, and a third bypass contact 24. The first bypass contact 20 is electrically connected to the second battery cell contact 14 of the battery cell 12a, the second bypass contact 22 is electrically connected to the first battery cell contact 14 of the battery cell 12b, and the third bypass contact 24 is electrically connected to the second battery cell contact 16 of the first battery cell contact 14.

While the battery bypass assembly 10 has been described and illustrated as having a first bypass contact 20, a second bypass contact 22, and a third bypass contact 24, it is within the scope of the present invention to have a battery bypass assembly 10 having more than three bypass contacts, i.e., four bypass contacts, five bypass contacts, six bypass contacts, etc.

Figure 2:
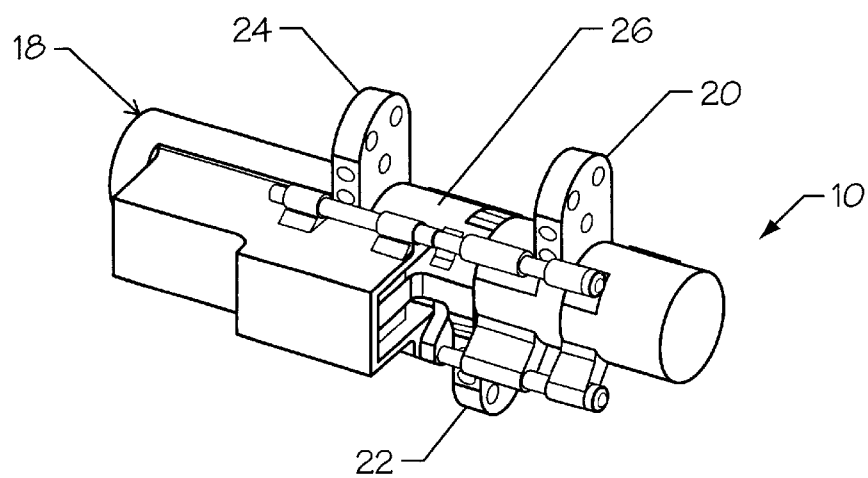
FIG. 2 is a perspective view of the battery bypass assembly, constructed in accordance with the present invention.
Figure 3:
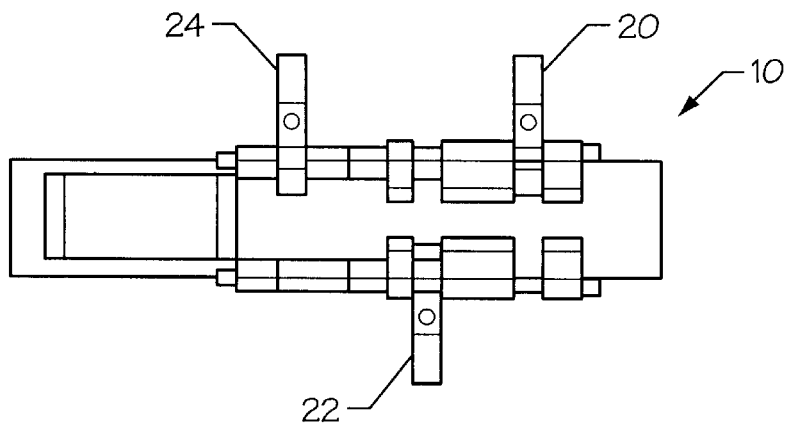
FIG. 3 is a side elevational view of the battery bypass assembly of FIG. 1, constructed in accordance with the present invention.

Referring now to FIGS. 2 and 3, the battery bypass assembly 10 additionally includes a housing body 26 . The housing body 26 is preferably constructed from a non-conductive plastic material formed through injection molding or vacuum molding although forming the housing body 26 from other materials through other processes is within the scope of the present invention.

Figure 4:
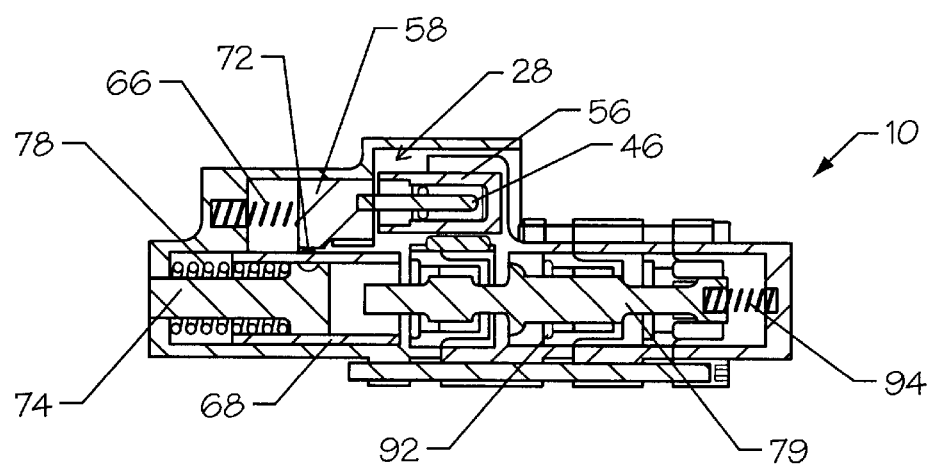
FIG. 4 is a side sectional view of the battery bypass assembly of FIG. 1, constructed in accordance with the present invention.
Figure 5:
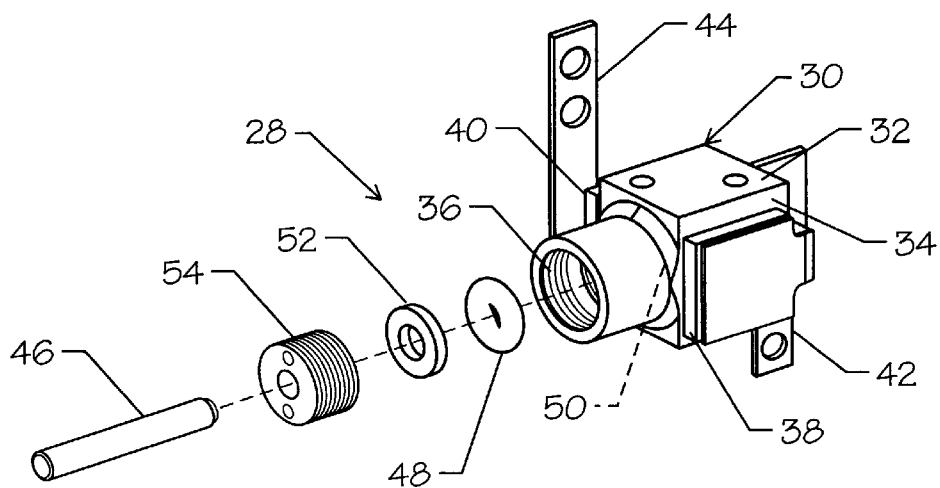
FIG. 5 is an exploded perspective view of an actuator assembly of the battery bypass assembly of FIG. 1, constructed in accordance with the present invention.

As illustrated in FIGS. 4 and 5, the battery bypass assembly 10 further includes an expansive material assembly 28 mounted within the housing body 26. The expansive material actuator assembly 28 includes an actuator diode assembly 30 having an actuator housing 32. The actuator housing 32 includes a plurality of sidewalls 34 and a threaded opening 36. A first diode 38 and a second diode 40 are mounted to opposite sidewalls 34 of the actuator housing 32. In a preferred embodiment, the first diode 38 and the second diode 40 are Schotky diodes having a threshold rating of approximately 0.7 volts although using other types of diodes 38, 40 having other threshold ratings are within the scope of the present invention.

A first diode contact 42 electrically connected to the first battery contact 14 is mounted to the first diode 38 and a second diode contact 44 electrically connected to the second battery contact 16 is mounted to the second diode 40. The expansive material actuator assembly 28 additionally includes an actuator output shaft 46 with at least a portion of the actuator output shaft 46 being received within the threaded opening 36 of the actuator housing 32. A substantially annular resilient O-ring 48 is positioned about the actuator output shaft 46 to releasably secure the actuator output shaft 46 within the threaded opening 36 and creating a void area 50 within the actuator housing 32 threaded opening. A washer 52 is slidably positioned over the actuator output shaft 46 nearingly adjacent the O-ring 48 to assist in guiding the actuator output shaft 46 and providing proper seal clearances, as will be described in further detail below. A threaded actuator plug 54 is slidably mounted over the actuator output shaft 46 and threadably received within the threaded opening 36.

A paraffin or other expansive material 56 is positioned within the void area 50 surrounding at least a portion of the actuator output shaft 46. The paraffin or other expansive material 56 is designed to expand upon melting thereby forcing the actuator output shaft 46 from the actuator housing 32 through the threaded opening 36. In a preferred embodiment the paraffin or other expansive material 56 expands by at least approximately fourteen (14%) percent although using a paraffin or other expansive material 56 having an expansion greater than approximately fourteen (14%) percent and less than approximately fourteen (14%) percent is within the scope of the present invention. Actual operation of the battery bypass assembly 10, including the expansive material actuator assembly 28 will be described in further detail below.

At present the battery bypass assembly 10 of the present invention includes a first embodiment as illustrated in FIGS. 1–7 and a second embodiment as illustrated in FIGS. 8–15. The battery bypass assembly 10 of the first embodiment includes a detent slide 58, as illustrated in FIG. 4, having a first slide surface 60 and a second slide surface 62 with the detent slide 58 slidably mounted within the housing body 26. The detent slide 58 has an aperture 64 for receiving at least a portion of the actuator output shaft 46. An actuator spring 66 biases the detent slide 58 in a general direction toward the expansive material actuator assembly 28 thereby maintaining the actuator output shaft 46 within the actuator housing 32 and inhibiting accidental release of the actuator output shaft 46 therefrom during vibrational events such as spacecraft testing and lift-off.

A substantially cylindrical detent housing 68, as also illustrated in FIG. 4, is positioned adjacent the detent slide 58 for allowing the detent slide 58 to freely slide thereon. The detent housing 68 has at least one housing aperture 70 for receiving a substantially spherical ball member 72. In a first position, the ball member 72 is positioned within the housing aperture 70 between the first slide surface 60 of the detent slide 58 and the detent slide 58. As the detent housing 58 moves in a general direction away from the expansive material actuator assembly 28 upon expansion of the paraffin or other expansive material 56, the ball member 72 will move out of the housing aperture 70 of the detent housing 68 and toward the second slide surface 62 of the detent housing 68. Actual operation of the detent housing 68 and detent slide 58 will be described in further detail below.

As illustrated in FIG. 4, the battery bypass assembly 10 of the present invention includes a plunger rod 74 at least partially receivable within the detent housing 68. The plunger rod 74 has an annular groove 76 aligned with the housing aperture 70 for receiving the ball member 72 therein. An activation spring 78 biases the plunger rod 74 with the ball member 72 maintaining the first and initial position of the plunger rod 74 relative to the detent housing 68. The activation spring 78 preferably has approximately ten (10 lbs.) pounds of force although other sizes of springs are within the scope of the present invention.

Figure 6:
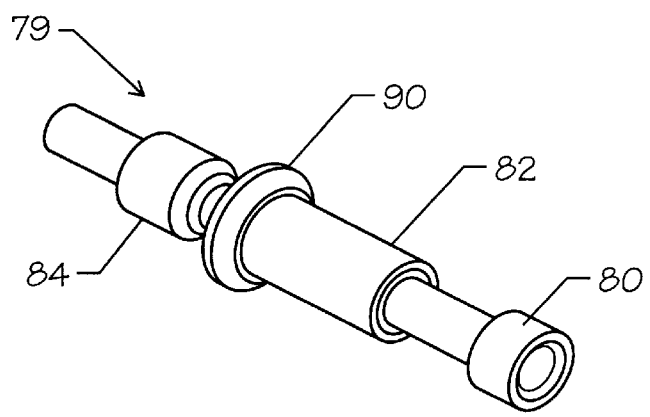
FIG. 6 is a perspective view of a plunger mechanism of the battery bypass assembly of FIG. 1, constructed in accordance with the present invention.
Figure 7:
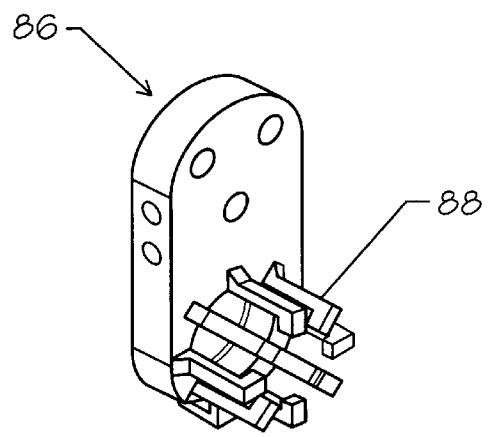
FIG. 7 is a perspective view of a flexure contact of the battery bypass assembly of FIG. 1, constructed in accordance with the present invention.
Figure 8:
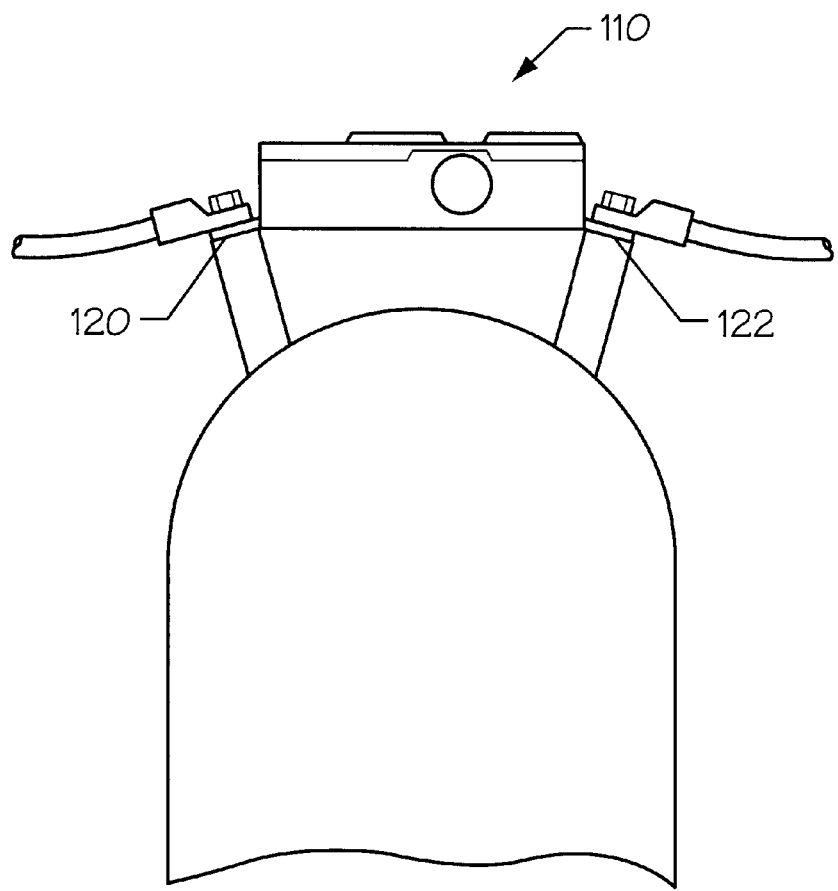
FIG. 8 is an elevational side view illustrating another embodiment of the battery bypass assembly, constructed in accordance with the present invention, with the battery bypass assembly being connected to a first battery cell.
Figure 12:
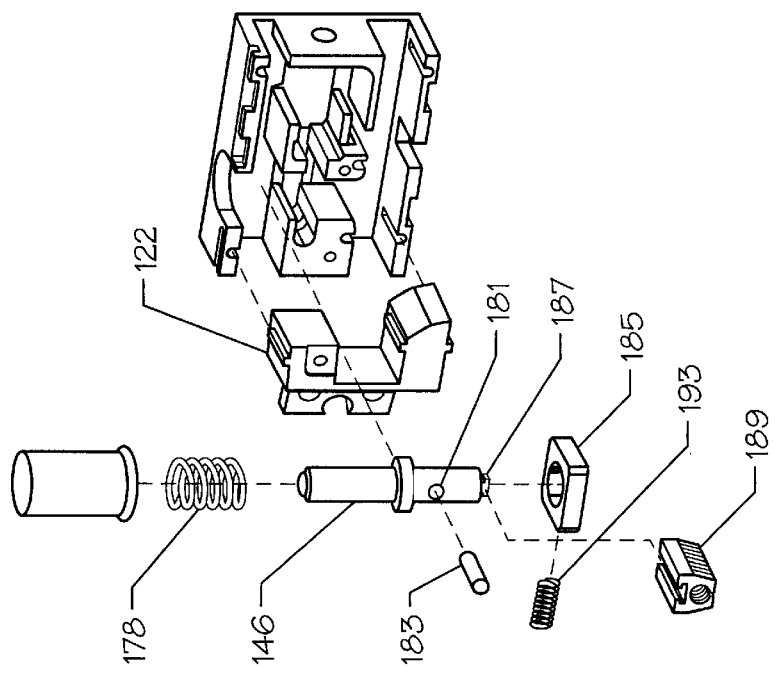
FIG. 12 is an exploded perspective view of a latch subassembly of the battery bypass assembly of FIG. 8, constructed in accordance with the present invention.
Figure 10:
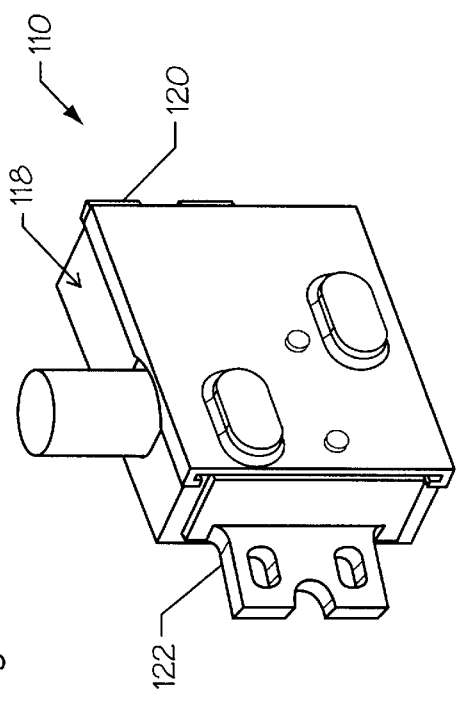
FIG. 10 is another perspective view of the battery bypass assembly of FIG. 8, constructed in accordance with the present invention with the cover being removed.
Figure 11:
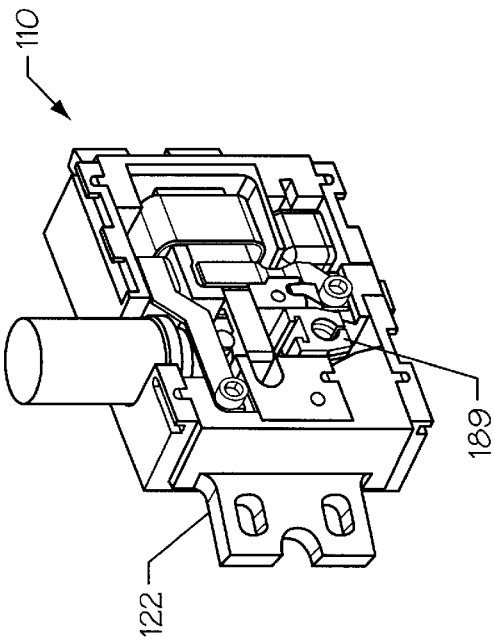
FIG. 11 is an exploded perspective view of the battery bypass assembly of FIG. 8, constructed in accordance with the present invention.

As illustrated in FIGS. 4 and 6, the battery bypass assembly 10 of the present invention includes a slidable plunger mechanism 79 contactable by the plunger rod 74 upon release of the plunger rod 74 from the first position. The plunger mechanism 79 includes a first plunger contact 80, a second plunger contact 82, and a third contact plunger 84 for contacting the respective bypass contacts 20, 22, and 24. As illustrated in FIG. 7, each bypass contact 20, 22, and 24 is preferably a flexure contact 86 with multiple contacts 88. The flexure contact 86 provides increased current capacity because current through each flexure contact 86 is split between the multiple contacts 88 thereby providing better current conduction and more consistent electrical loading between the flexible contact 88 interfaces. Preferably, each flexure contact 86 includes eight (8) flexible contacts 88 machined from a single piece of copper although constructing each flexure contact 86 from other conductive materials and/or several pieces is within the scope of the present invention.

When in the first position, the first plunger contact 80 of the plunger mechanism 79 contacts the first bypass contact 20 and the second plunger contact 82 contacts the second bypass contact 22 with the flexure contacts 86 of each bypass contact 20, 22 squeezing down on the plunger mechanism 79 thereby closing the circuit between the first bypass contact 20 and the second bypass contact 22. As the detent slide 58 is moved by action of the expansive material actuator assembly 28, thereby releasing the ball member 72, the plunger rod 74 is released and, under the bias of the activation spring 78, contacts the plunger mechanism 79 and moves the plunger mechanism 79 to a second position. In the second position, the first plunger contact 80 no longer contacts the first bypass contact 20, the second plunger contact 82 continues to contact the second bypass contact 22, and the third plunger contact 84 moves into contact with the third bypass contact 24 to electrically connect the plunger mechanism 79 to the second bypass contact 22 and the third bypass contact 24 thereby opening the circuit between the first bypass contact 20 and the second bypass contact 22 and closing the circuit between the second bypass contact 22 and the third bypass contact 24. The flexure contact 86 self-centers and guides the plunger mechanism 79 while sliding within the housing body 26 from the first position to the second position such that additional mechanisms for guiding the plunger mechanism 79 are not required.

The plunger mechanism 79 further includes a stop 90 formed between the second plunger contact 82 and the third plunger contact 84. As the plunger mechanism 79 moves from the first position to the second position, the stop 90 of the plunger mechanism 79 contacts a shoulder 92 formed in the housing body 26. The contact between the stop 90 and the shoulder 92 inhibits further movement of the plunger mechanism 79 relative to the housing body 26 to insure the closing of the circuit between the second bypass contact 22 and the third bypass contact 24.

Furthermore, as illustrated in FIG. 4, the battery bypass assembly 10 of the present invention includes a stabilizing spring 94 between the plunger mechanism 79 and the housing body 26 adjacent the first plunger contact 80. The stabilizing spring 94 maintains the position of the plunger mechanism 79 during vibrational events while in the first position. Preferably the stabilizing spring 79 has a one (1 lb.) pound force although other sizes of springs are within the scope of the present invention.

The operation of the first embodiment of the battery bypass assembly 10 of the present invention will now be described. During operation of the battery bypass assembly 10, the first diode 38 and the second diode 40 of the expansive material actuator assembly 28 sense current through the battery cell 12. When voltage in the battery cell 12 has dropped to a predetermined voltage, such as when the battery cell 12 is failing or has failed, a back EMF in the circuit through the battery cell 12 causes current to flow through the first diode 38 and the second diode 40. As current flows through the first diode 38 and the second diode 40, the first diode 38 and the second diode 40 begin to heat up and the paraffin or other expansive material 56 within the void area 50 of the actuator housing 32 begins to melt and expand. As the paraffin or other expansive material 56 expands, the paraffin or other expansive material 56 forces the actuator output shaft 46 from within the actuator housing 32 and through the threaded opening 36. The movement of the actuator output shaft 46 overcomes the bias of the actuator spring 66 causing the detent slide 58 to move in a general direction away from the expansive material actuator assembly 28.

As the detent slide 58 moves away from the expansive material actuator assembly 28, the second slide surface 62 of the detent slide 58 moves over the detent housing 68. The activation spring 78 forces the ball member 72 from the annular groove 76 of the plunger rod 74. The removal of the ball member 72 from the annular groove 76 allows the activation spring 76 to bias the plunger rod 74 into contact with the plunger mechanism 79 to move the plunger mechanism 79 into the second position, as described above. The plunger mechanism 79 continues to move until the stop 90 of the plunger mechanism 79 contacts the shoulder 92 formed in the housing body 26.

The second embodiment of the battery bypass assembly 110 of the present invention is illustrated in FIGS. 8–15. As illustrated in FIGS. 8–11 the battery bypass assembly 110 has the main body 118 with a first bypass contact 120 electrically connected to the first battery contact 114 and a second bypass contact 122 electrically connected to the second battery contact 116. A test contact 124 is provided between the first bypass contact 120 and the second bypass contact 122. As illustrated in FIG. 15, a fuse assembly 196 is provided between the first bypass contact 120 and the test contact 124.

The battery bypass assembly 110 includes the expansive material actuator assembly 128, as illustrated in FIG. 13. The plunger mechanism 179 varies from the above-described plunger mechanism 79 in that the plunger mechanism 179 includes a plunger aperture 181 for receiving a plunger pin 183 resting upon a latch plate 185, and an annular slot 187 for connecting to a conductive contact bridge 189. The contact bridge 189 closes the circuit between the first bypass contact 120 and the second bypass contact 122 when the plunger mechanism 179 moves from the first position to the second position, as will be described in further detail below.

As in the first embodiment, the plunger mechanism 179 is biased toward the second position by the activation spring 178 with the interaction of the plunger pin 183 against the latch plate 185 maintaining the plunger mechanism 179 in the first position. The latch plate 185 has a rod-receiving slot 191 formed therein for receiving the plunger rod pin 183 upon activation of the expansive material actuator assembly 128 and allowing the plunger mechanism 179 to move into the second position. A latch plate spring 193 biases the latch plate 185 to maintain the latch plate 185 in the first position.

The operation of the second embodiment of the battery bypass assembly 110 of the present invention will now be described. During operation of the battery bypass assembly 110 similar to the first embodiment of the battery bypass assembly 10, the first diode 138 and the second diode 140 of the expansive material actuator assembly 128 sense current through the battery cell 112. When voltage in the battery cell 112 has dropped to a predetermined voltage, such as when the battery cell 112 is failing or has failed, a back EMF in the circuit through the battery cell 112 causes current to flow through the first diode 138 and the second diode 140. As current flows through the first diode 138 and the second diode 140, the first diode 138 and the second diode 140 begin to heat up and the paraffin or other expansive material 156 within the void area 150 begins to melt and expand. As the paraffin or other expansive material 156 expands, the paraffin or other expansive material 156 forces the actuator output shaft 146 from within the void area 150 and through the threaded opening 136. The actuator output shaft 146 pushes against the latch plate 185 overcoming the bias of the latch plate spring 193 causing the latch plate 185 to move thereby allowing the plunger rod pin 183 to fall through the rod-receiving slot 191 in the latch plate 185.

As the latch plate 185 moves under the force of the actuator output shaft 146, the plunger mechanism 179 moves into the second position with the contact bridge 189 moving, under the bias of the activation spring 176, into contact with the test contact 124 and the second bypass 122 contact thereby closing the circuit through the battery bypass assembly 110 of the first battery contact 14 and the second battery 16 contact through the fuse assembly.

The battery bypass assembly 10, 110 of the present invention is perfectly suited for spacecraft and other environments. The battery bypass assembly 10 of the first embodiment is a perfectly suited for lithium ion battery cells in that it is a "make before break" bypass. The battery bypass assembly 10 maintains a continuous circuit with no interruption of current flow. The battery bypass assembly 110 of the second embodiment is a direct shorting device bypass which simply closes the new circuit which is perfectly suited for all other types of battery cells. Furthermore, in the second embodiment, the battery bypass assembly 110 includes a safety device, i.e., the fuse assembly 196 in case the battery bypass assembly 110 was to inadvertently close the circuit of a fully charged or "good" battery cell 112.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A battery bypass assembly for bypassing a first battery cell electrically connected to a second battery cell, each battery cell having a first battery contact and a second battery contact, the battery bypass assembly comprising:

a housing having a first bypass contact and a second bypass contact;

voltage sensing means within the housing and electrically connected between the first battery contact and the second battery contact for sensing a predetermined voltage loss in the battery cell;

an expansive material within the housing, the expansive material expandable upon the voltage sensing means sensing a predetermined voltage loss in the battery cell;

a plunger mechanism slidably mounted within the housing and moveable from a first position to a second position;

maintaining means for maintaining the plunger mechanism in the first position, the maintaining means moveable to allow the plunger mechanism to move into the second position; and actuating means contacting the expansive material and the maintaining means for moving the maintaining means upon expansion of the expansive material;

wherein the plunger mechanism, upon reaching the second position bypasses the first battery cell.

2. The battery bypass assembly of claim 1 and further comprising:

a third bypass contact;

wherein the first bypass contact is electrically connected to the first battery contact of the first battery cell, the second bypass contact is electrically connected to the first battery contact of the second battery cell, and the third bypass contact is electrically connected to the second battery contact of the first battery cell.

3. The battery bypass assembly of claim 2 and further comprising:

"n" bypass contacts electrically connected to one of the battery cells.

4. The battery bypass assembly of claim 2 wherein the plunger mechanism has a first plunger contact, a second plunger contact, and a third plunger contact, such that in the first position, the first plunger contact contacts the first bypass contact and the second plunger contact contacts the second bypass contact.

5. The battery bypass assembly of claim 2 wherein in the second position, the second plunger contact contacts the second bypass contact and the third plunger contact contacts the third bypass contact.

6. The battery bypass assembly of claim 1 and further comprising:

a test contact electrically connected to the first bypass contact.

7. The battery bypass assembly of claim 6 and further comprising:

a contact bridge secured to the plunger mechanism for electrically connecting the second bypass contact to the test contact.

8. The battery bypass assembly of claim 1 wherein the expansive material is a paraffin material.

9. The battery bypass assembly of claim 1 wherein the voltage sensing means is a first diode and a second diode, the paraffin material being positioned between the first diode and the second diode.

10. The battery bypass assembly of claim 1 wherein the maintaining means is a plunger rod having an annular slot, and further wherein the maintaining means is ball detent mechanism between the plunger rod and the actuating means, the ball detent mechanism having detent slide slidable along a detent housing, the detent housing having an aperture aligned with the annular slot, a ball member being positioned within the annular slot, the plunger rod contactable with the plunger mechanism to move the plunger mechanism from the first position to the second position.

11. The battery bypass assembly of claim 1 and further comprising:

an activation spring for biasing the plunger rod toward the plunger mechanism.

12. The battery bypass assembly of claim 1 wherein the plunger mechanism has an aperture for receiving a plunger rod, and further wherein the maintaining means is a latch housing having a latch housing aperture for slidably receiving the plunger mechanism, the latch housing having a slot for selectively receiving the plunger rod thereby allowing the plunger mechanism to slide through the latch housing.

13. The battery bypass assembly of claim 12 and further comprising:

an activation spring for biasing the plunger mechanism through the latch housing.

14. A battery bypass mechanism for bypassing a battery cell, the battery cell having a first battery contact and a second battery contact, the battery bypass mechanism comprising:

a first bypass contact electrically connected to the first battery contact; a second bypass contact electrically connected to the second battery contact;

contact means selectively movable to close the circuit between the first battery bypass contact and the second bypass contact; and expansive actuating means for actuating movement of the contact means to close the circuit and bypass the battery cell upon occurrence of a predetermined event.

15. The battery bypass mechanism of claim 14 and further comprising:

a third bypass contact electrically connected to the first battery contact;

wherein the contact means is a plunger mechanism having a first plunger contact, a second plunger contact, and a third plunger contact, such that in a first position, the first plunger contact contacts the first bypass contact and the second plunger contact contacts the second bypass contact and in a second position, the second plunger contact contacts the second bypass contact and the third plunger contact contacts the third bypass contact.

16. The battery bypass mechanism of claim 14 wherein the predetermined event is a predetermined voltage loss in the battery cell.

17. The battery bypass mechanism of claim 14 wherein the expansive actuating means is an actuating rod embedded in a paraffin material, the paraffin material expanding upon occurrence of the predetermined event to substantially eject the actuating rod.

18. The battery bypass mechanism of claim 14 and further comprising:

releasable means for releasably holding the contact means;

wherein the actuating rod contacts the releasable means to release the contact means to close the circuit.

19. A method for bypassing a battery cell with a battery bypass assembly, the battery bypass assembly having a first bypass contact electrically connected to a first battery contact and a second bypass contact electrically connected to the second battery contact, the method comprising:

selectively moving a conductive bar between the first battery bypass contact and the second battery contact from a first position to a second position to close the circuit;

providing a plunger rod within an expansive material;

expanding the expansive material upon the occurrence of a predetermined event;

substantially ejecting the plunger rod from the paraffin material;

moving the conductive bar to the second position; and closing the circuit and bypassing the battery cell.

20. The method of claim 18 and further comprising:

means for releasably securing the conductive bar in the first position.

* * * * *